3,535,484
METHOD OF IMPROVING PHYSICAL PROPERTIES OF ELECTRIC RESISTANCE WELDED STEEL PIPE
William E. Snow and Joseph R. Pegues, Birmingham, Ala., assignors to American Cast Iron Pipe Company, Birmingham, Ala., a corporation of Georgia
Filed May 26, 1967, Ser. No. 641,579
Int. Cl. B23k 31/06
U.S. Cl. 219—67      10 Claims

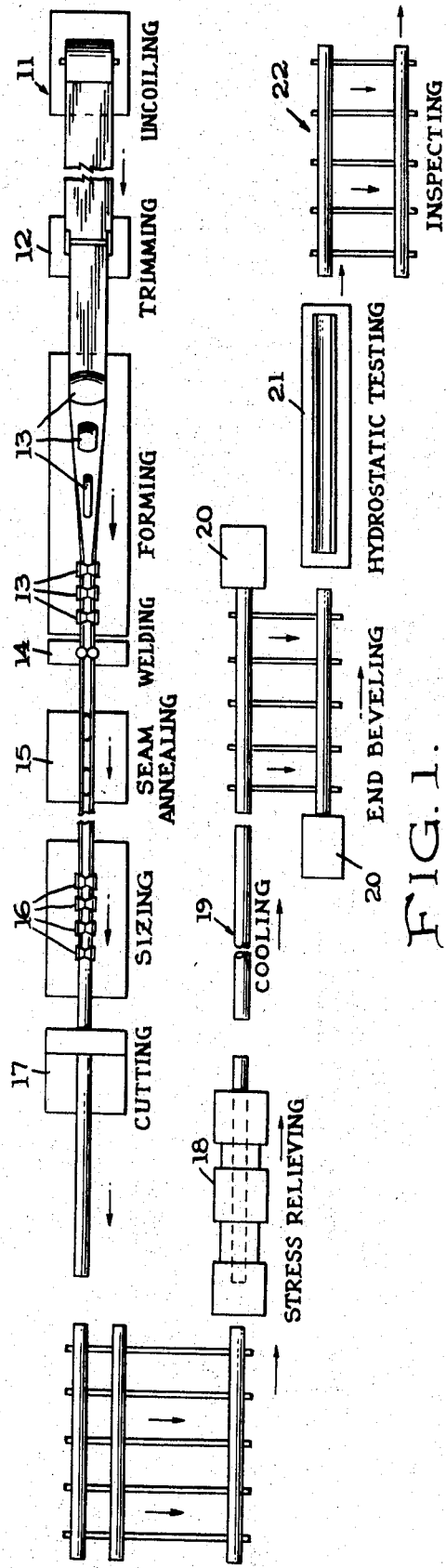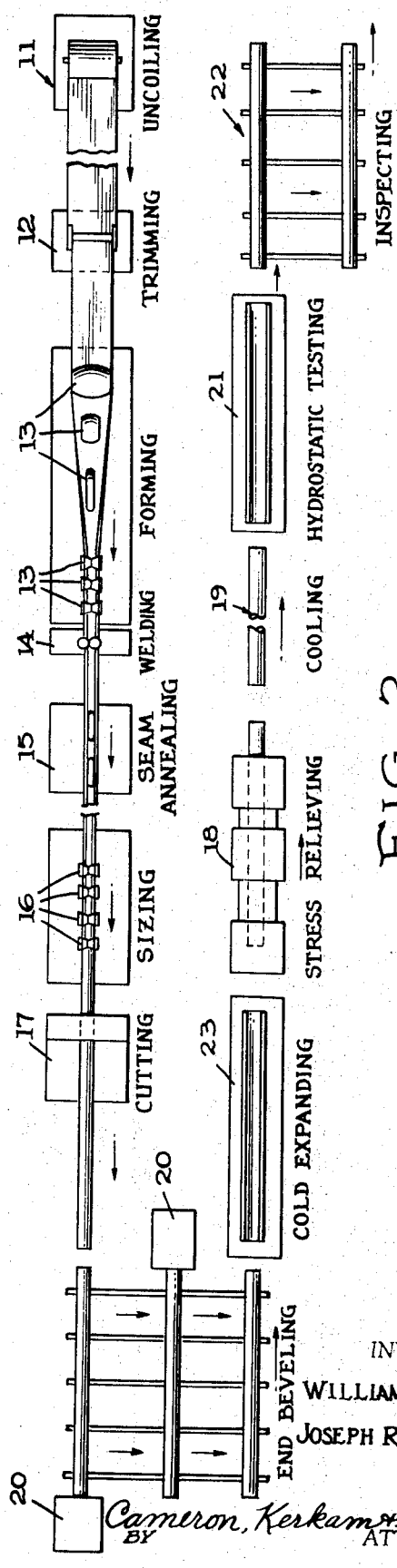

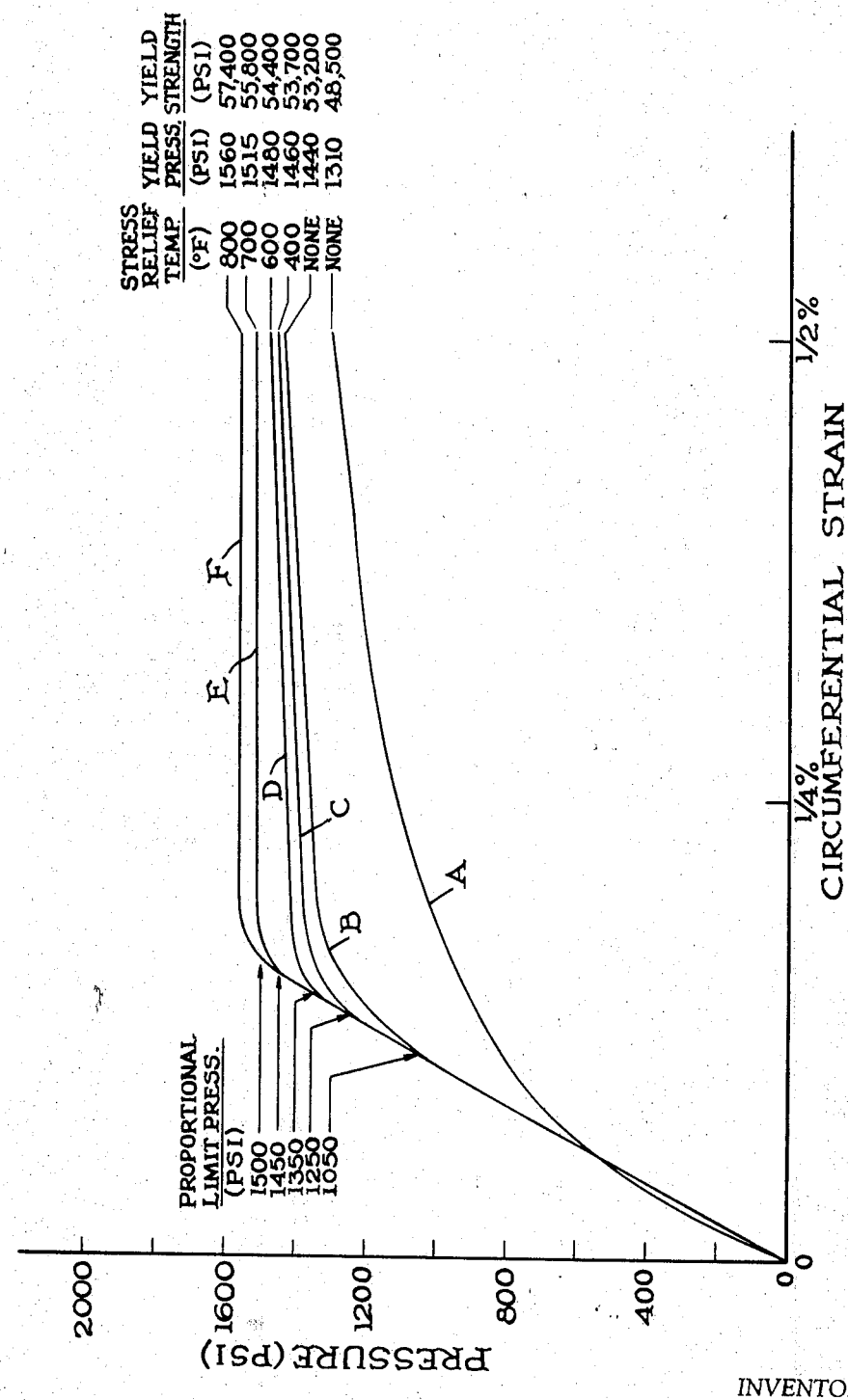

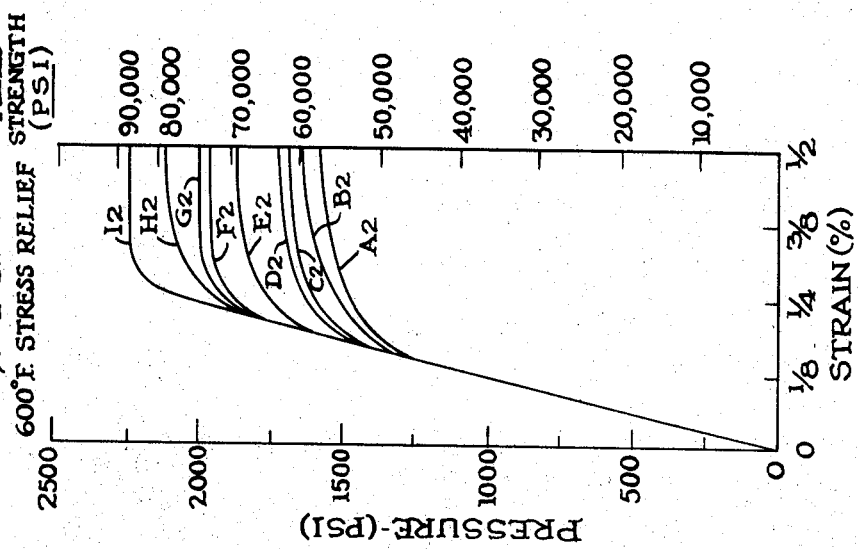
FIG. 6. 600°F. STRESS RELIEF
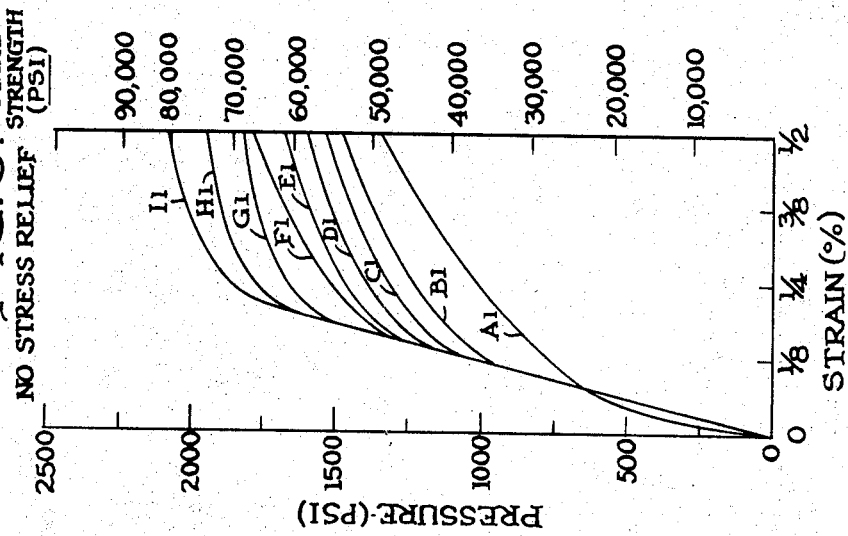
FIG. 5. NO STRESS RELIEF
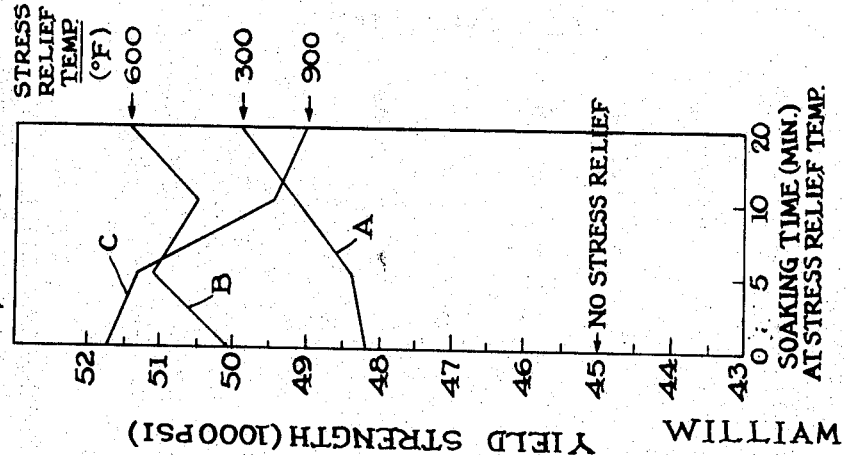
FIG. 4.
INVENTORS
WILLIAM E. SNOW
JOSEPH R. PEGUES
BY Cameron, Kerkam & Sutton
ATTORNEYS United States Patent Office 3,535,484
Patented Oct. 20, 1970

ABSTRACT OF THE DISCLOSURE

A high-speed, low-cost method for improving the physical properties of electric resistance welded steel pipe which has been sized in a cold state by either external compression or internal expansion comprising the steps of rapidly heating the pipe to a selected temperature in the range of from about 300° F. to about 1000° F., depending upon the grade of steel used, removing the pipe from the source of heat as soon as the pipe has reached the desired temperature, and then permitting the pipe to air-cool to ambient temperature. The rapid low-temperature heating of the pipe effectively relieves the residual stresses therein and significantly increases the tensile strength, yield strength and proportional limit of the pipe.

---

This invention relates to the production of electric resistance welded steel pipe and tubing, hereinafter referred to as ERW pipe in the interest of brevity, and more particularly to methods of improving the physical properties of ERW pipe, especially tensile strength, yield strength and proportional limit.

The production of ERW pipe normally consists of the following steps which convert steel in coiled strip or sheet form to a welded tubular form: (1) uncoiling, (2) slitting or trimming, (3) forming, (4) welding, (5) sizing, and (6) finishing.

In ERW pipe mills adapted to produce the larger sizes of pipe up to 20 inches in diameter with wall thicknesses up to .500 inch, a coil of steel strip of appropriate width and thickness is uncoiled, passed through an edge trimmer where the desired width is established and the edges are made smooth and clean for good welding, and processed into pipe on a continuous basis at rates of from about 30 to about 250 lineal feet per minute. Pipe of the smaller sizes is commonly manufactured from wide-width coils which are uncoiled, slit into two or more strips of appropriate width, and recoiled prior to use in the pipe mill.

In the forming step, the uncoiled steel strip is progressively changed from flat form to a roughly circular form by movement through a series of forming rolls. From the final forming rolls, the now circular strip passes into the welding section of the mill where the edges are squeezed together at the correct pressure and are simultaneously heated to the proper temperature to provide a weld between the edges, the welding heat being supplied by either a low frequency or a high frequency resistance welding machine. The pipe may then be subjected to appropriate post-weld treatment, such as normalizing of the welded seam.

The welded pipe is next sized to the desired outside diameter and degree of roundness by either of two methods. In some pipe mills, the width of the steel strip and the welding pressure are so selected that the welded pipe is from 1% to 1½% smaller in diameter than the desired finished size. Such undersize pipe is first cut to the proper length, after which the individual pipe sections are placed in a full length circular die and hydraulically expanded to the desired diameter. In other mills, the welded pipe is from ¼% to ½% larger than the desired diameter, in which event the oversize pipe is passed through rolls which are so shaped and so spaced as to reduce or compress the pipe diameter by from ¼% to ½%. In either case, the cold sizing produces straight, round pipe of the proper diameter.

After sizing, the pipe is cut into sections of predetermined length by a flying cut-off machine which travels with the pipe while cutting (unless the cutting is performed prior to sizing, as described above), and the individual pipe sections are subjected to appropriate finishing operations, such as end bevelling, hydrostatic proof testing and inspection.

Pipe and tubing produced by the ERW process generally are required to possess certain minimum physical properties as prescribed by such specification agencies as ASTM (American Society for Testing and Materials) and API (American Petroleum Institute). These specifications are also restrictive in that they prescribe certain maximum values for the alloying constituents in the metal. To meet the strength requirements of a particular specification, the pipe manufacturer must select a steel composition within the restrictive chemistry of the specification, but may obtain some increase in strength from certain cold working operations during manufacture of the pipe.

ERW pipe usually is produced from steels which contain less than 0.30% carbon and less than 1.40% manganese, plus small amounts of other permissible alloying agents. By varying these constituents, by variations in basic steel producing practices and by variations in cold working, ERW pipe can be produced which, in the finished state, may have minimum physical properties within the following approximate ranges:

Tensile Strength—48,000 p.s.i. to 80,000 p.s.i.
Yield Strength—30,000 p.s.i. to 65,000 p.s.i.
Elongation—12% to 35%

The interrelationship between the alloying elements and strength are well known to the metallurgist; and since different pipe manufacturers operate their mills differently as respects the methods of sizing and cold working, the chemical analysis for a given grade of pipe will vary from mill to mill. From a practical standpoint, however, the higher the total percentage of alloying elements in the steel, the greater will be the cost of producing the pipe, this higher cost being due to the actual cost of the additional alloys plus a higher scrap rate from operating problems caused by the higher strength material. Consequently, it would be desirable to produce pipe of any given grade or yield strength with the lowest possible amount of alloying elements.

Certain other properties of the finished pipe, such as impact strength and weldability, are also related to the amount of alloys present in the steel. Again, it is desirable to keep the total alloys as low as possible in order to obtain the best combination of impact strength and weldability.

Prior to the present invention, pipe manufacturers relied primarily on cold working, such as cold expansion or cold sizing, as a means for producing higher strength pipe with the lowest possible amount of alloying elements. From a metallurgical standpoint, cold expansion causes a plastic deformation in the circumferential direction which, in accordance with the Bauschinger effect, results in an increase in yield strength in the circumferential or hoop direction and a decrease in yield strength in the longitudinal direction. When, on the other hand, the pipe is made oversize and the diameter is reduced or compressed to the desired size by external sizing rolls, there is a plastic deformation along the longitudinal axis of the pipe which causes an increase in strength in this direction, but a decrease in strength in the circumferential or hoop direction. This decrease in circumferential yield strength requires the pipe producer using external sizing to incorporate a higher percentage of alloying elements in the steel, in order to produce pipe of a given yield strength, than is required by a manufacturer using the hydraulic cold expansion method of sizing.

SUMMARY OF THE INVENTION

It is generally recognized that the Bauschinger effect is caused by residual stresses in the metal. As applied to the sizing or cold working of pipe, the increase in yield strength in the direction of plastic deformation is due partially to the residual tensile stresses in this direction and partially to grain refinement, whereas the reduction in yield strength and proportional limit in the opposite direction is due to the residual compressive stresses in that direction.

The present invention results from an investigation of the Bauschinger phenomenon, and is based on the discovery of certain new and useful techniques for relieving residual stresses in ERW pipe which significantly improve the tensile strength, yield strength and proportional limit of the pipe.

Basically, the invention resides in what may be termed a high-speed, low-temperature stress relieving operation applied to ERW pipe which has been sized in a cold state comprising the steps of rapidly heating the pipe to a temperature below the transformation temperature of the steel, preferably within the range of from about 300° F. to about 1000° F., removing the pipe from the source of heat as soon as the pipe has reached the desired temperature, and then cooling the pipe to ambient temperature. An outstanding feature of this procedure is the rapidity with which the pipe can be relieved of residual stresses therein with a consequently increase in tensile strength, yield strength and proportional limit.

It is thus a primary object of the present invention to provide a high-speed, low-cost method of improving the physical properties of ERW pipe which has been sized in a cold state characterized by the steps of heating the pipe to a temperature of from about 300° F. to about 1000° F. while moving through the heating zone at a high rate of speed, and then cooling the pipe to ambient temperature.

It has also been discovered that an even greater improvement in circumferential physical properties can be obtained in ERW pipe by a cold expansion of the pipe prior to subjecting it to a high-speed, low-temperature stress relieving procedure.

Accordingly, it is another object of the invention to provide a novel method of improving the physical properties of ERW pipe which is characterized by the steps of expanding the pipe in cold state by the application of internal pressure, rapidly heating the cold expanded pipe to a temperature of from about 300° F. to about 1000° F., and then cooling the pipe to ambient temperature before finishing.

BRIEF DESCRIPTION OF THE DRAWING

FIGS. 1 and 2 are schematic diagrams illustrating the layouts of two different ERW pipe mills adapted for carrying out the method of the present invention; and FIGS. 3, 4, 5 and 6 are graphical plots of test data indicating the improvement in physical properties of ERW pipe obtained by the method.

DESCRIPTION OF THE PREFERRED EMBODIMENTS

Referring first to FIG. 1, there is diagrammatically illustrated therein the layout of a pipe mill of manufacturing ERW steel pipe in accordance with the simplest embodiment of the method of the present invention, i.e., one wherein welded pipe which has been sized in a cold state by external compression is subjected to a high-speed, low-temperature stress relieving operation which materially improves its physical properties.

As indicated by the legends in FIG. 1, the pipe is made in conventional manner by uncoiling at station 11 a coiled strip of steel having a chemical composition conforming to the requirements specified for the type and grade of pipe to be produced, and then moving the strip continuously through an edge trimming device 12, a series of forming rolls 13 which convert the flat strip into tubular form, an electric resistance welding machine 14 which welds the edges of the strip together to form the longitudinal seam of the pipe, and a weld seam annealing station 15. After welding and annealing, the pipe is cooled as it continues to move toward the sizing stands where the now-cold pipe is circumferentially compressed and simultaneously rounded by the external pressure of a plurality of sizing rolls 16 which reduce the size of the pipe to the desired finished outside diameter. After sizing, the pipe is cut into sections of a predetermined length by a flying cut-off device 17 which travels with the pipe while cutting. It will be understood that all of the above-mentioned uncoiling, trimming, forming, welding, annealing, sizing and cutting operations are conventional and may be performed by any suitable equipment known to the art.

Normally, the individual pipe sections would now be finished in the usual manner by such operations as straightening, if necessary, end beveling, hydrostatic proof testing and inspection, preparatory to shipment. The method of the present invention, however, introduces an additional step into the manufacturing process which results in an improvement in yield strength and proportional limit equivalent to at least one API grade. This novel step, which has been referred to above as a high-speed, low-temperature stress relieving operation, consists in rapidly heating the pipe to a temperature below the transformation temperature of the steel, preferably within the range of from about 300° F. to about 1000° F., and then cooling the pipe to ambient temperature.

In the embodiment illustrated in FIG. 1, the stress relieving is accomplished by moving the individual pipe sections at high speed through a gas-fired barrel type furnace 18, as by means of a water-cooled roller conveyor, the temperature within the furnace being such as to heat the pipe to the desired temperature in a period of not more than about one minute, and the length of the furnace and the speed at which the pipe is conveyed therethrough being so related that the pipe leaves the furnace substantially as soon as its temperature reaches the predetermined value. For exampe, it has been found that pipe sections 65 feet in length can be successfully treated in accordance with the invention by moving them at a rate of from 30 feet to 70 feet per minute through a furnace approximately 35 feet long wherein the wall temperature of the furnace is approximately 3000° F., so that the pipe is heated to a temperature of approximately 600° F. by the time it leaves the furnace.

Upon leaving the furnace 18, the pipe is cooled to ambient temperature as indicated at 19, preferably by permitting it to air-cool naturally. Although in the case of pipe which is stress relieved at temperatures of 600° F. or less, there is little difference between air cooling and water cooling insofar as improvement in the physical properties of the pipe is concerned, it has been found that, at stress relieving temperatures greater than 600° F., air cooling results in a greater improvement in yield strength and proportional limit than water cooling.

When the pipe has cooled to ambient temperature after the stress relieving operation, it is finished in conventional manner, as by beveling the ends by means of cutters 20, proof testing the pipe in a hydrostatic testing machine 21, and inspecting the pipe for defects at station 22, preparatory to shipment of the finished pipe.

The embodiment of the invention illustrated in FIG. 2 comprises substantially the same procedural steps, and utilizes the same equipment, as that of FIG. 1, except that the individual pipe sections may be beveled on the ends prior to, rather than after, the stress relieving operation, and except for inclusion of an additional cold expansion step at station 23 preceding stress relief. When the increase in pipe diameter due to cold expansion is limited to approximate ¼% or less, the expansion may be readily effected in a conventional hydrostatic test press. For greater degrees of expansion, however, it may be desirable to hold the pipe in an external die while the internal hydrostatic pressure is being applied. Alternatively, the cold expansion may be accomplished by the use of other means, such as mechanical expanders of any suitable construction. Should the amount of cold expansion tend to produce bowing or bending of the pipe, the manufacturing procedure may be further modified by including a pipe straightening step, as by the use of a cross roll straightener, between the cold expansion and stress relieving steps.

In this second embodiment of the invention, it will be understood that the external sizing rolls 16 compress the pipe so that the outside diameter thereof when cut into sections is less than the desired finished diameter by an amount equal to the increase in diameter resulting from the subsequent cold expansion step.

Either of the two procedures described above with reference to FIGS. 1 and 2 will produce a substantial improvement in the physical properties of the pipe being processed, particularly from the standpoint of increasing the yield strength. For example, ring expansion tests made on 16″ diameter, .219″ wall thickness steel pipe of a specified basic steel composition showed that the yield strength of the pipe was significantly increased as a result of either the stress relieving step alone, or cold expansion followed by stress relief, as indicated below:

Method of production: (p.s.i.)          Yield strength
Conventional-externally sized, no cold expansion, no stress relief _____ 50,600
Externally sized, stress relieved at 600° F. __ 56,000
Externally sized, cold expanded .03″, stress relieved at 600° F. _____ 61,500
Externally sized, cold expanded .07″, stress relieved at 600° F. _____ 68,200
Externally sized, cold expanded .14″, stress relieved at 600° F. _____ 73,300

Tests have also been made to determine the effect of improvement in yield strength of stress relieved pipe in comparison with an identical pipe made by the conventional procedure, without either stress relief or cold expansion, and an identical pipe which was subjected to cold expansion, but no stress relief. The results of these tests are graphically illustrated in FIG. 3 which is a plot of pressure-strain curves determined by the ring expansion method for rings cut from 16″ pipe having a wall thickness of .219″, made for line pipe service and specified at API X52 grade (52,000 p.s.i. minimum yield strength). As will be seen from curve A, the pipe made by the conventional procedure had no proportional limit, indicating a high level of residual compressive stresses resulting from the external sizing operation, and had a calculated yield strength at ½% strain of only 48,500 p.s.i., which is less than the minimum specified yield strength for X52 grade pipe. Curves C, D, E and F represent the tests on identical pipes which were stress relieved at temperatures of 400° F., 600° F., 700° F. and 800° F., respectively, and show proportional limit pressures ranging from 1250 to 1500 p.s.i., yield pressures ranging from 1460 to 1560 p.s.i., and yield strengths ranging from 53,700 to 57,400 p.s.i. Curve B, representing the results of ½% cold expansion alone, shows that the improvement in both yield strength and proportional limit was less than that due to a 400° F. stress relieving operation.

The data plotted in FIG. 4 illustrates the effect on yield strength of varying the length of time during which the temperature of the pipe is maintained at the stress relieving temperature, curves A, B and C indicating the variation in yield strength of pipes which were stress relieved at 300° F., 600° F. and 900° F., respectively, as the soaking time was increased from 0 minutes to 5, 10 and 20 minutes. All of these tests were made on 8⅝″ diameter, .188″ wall thickness steel pipe of uniform chemical composition having a yield strength of 45,000 p.s.i. prior to subjection to the high-speed, low-temperature stress relief procedure previously described with reference to FIG. 1.

As indicated in FIG. 4, the increase in yield strength resulting from the stress relief step, with no soaking time, i.e., when the pipe is removed from the source of heat as soon as it reaches the predetermined stress relief temperature, is greater as the stress relief temperature is increased, being approximately 48,200 p.s.i. at a stress relief temperature of 300° F., 50,100 p.s.i. at 600° F., and 51,700 p.s.i. at 900° F. At a stress relief temperature of 300° F., the yield strength increased as the soaking time increased, but even 20 minutes of soaking time did not raise the yield strength to that obtained at 600° F. with no soaking time. On the other hand, at a stress relief temperature of 900° F., the yield strength was at a maximum when there was no soaking time, and decreased as the soaking time increased. At a stress relief temperature of 600° F., the yield strength increased about 1,000 p.s.i. when the soaking time was increased from 0 minutes to 5 minutes, but further increases in the soaking time did not produce any significant change in the yield strength.

As a result of these and other investigations of the effects of high-speed, low-temperature stress relief on the yield strength and proportional limit of steel pipe, it has been found that, although improvements in these physical properties can be achieved by stress relieving at temperatures ranging from about 300° F. to about 1000° F., it is preferably from the standpoint of efficiency and economy in the commercial production of ERW steel pipe to use a stress relief temperature of approximately 600° F., and to remove the pipe from the source of heat as soon as it reaches that temperature, i.e., with no soaking time.

Further tests have been made on ERW steel pipe to determine the effect on proportional limit and yield strength of various degrees of cold expansion without subsequent stress relief, and various degrees of cold expansion followed by stress relief at 600° F.

These tests were made on rings cut from a 16″ diameter, .219″ will thickness steel pipe, 65 feet in length, which had been produced in conventional manner, i.e., without either stress relief or cold expansion, and had not been hydrostatically proof tested in the pipe mill. In order to obtain test specimens with different degrees of cold expansion, the pipe was cut to provide five sections 10 feet in length, each section was placed inside of a heavy walled steel tube whose inside surface had been step-bored to various internal diameters, and cold expansion was then accomplished by closing the ends of the pipe section with rubber gasketed caps, filling the pipe with water and increasing the internal pressure sufficiently to cause the pipe to yield and expand transversely until it contacted the various steps inside the surrounding heavy walled tube. Each step inside the tube was approximately 11 inches long. After eliminating the portions of the pipe adjacent the edge of each step, sections approximately 7 inches long were obtained, each having a uniform diameter representing a particular degree of cold expansion, and from these sections were cut test rings 3 inches in length. As controls, similar test rings were cut from the unexpanded portion of the same pipe. Half of the rings cut from the unexpanded section and each expanded section were stress relieved by being brought up to a temperature of 600° F. in approximately 30 seconds and then allowed to air-cool to ambient temperature. Transverse yield strengths and proportional limits were then determined with a standard ring expansion test device and roller chain extensometer in accordance with API and ASTM specifications.

The results of these tests, which show an unexpected improvement in proportional limit and yield strength produced by the combination of cold expansion and stress relief, are summarized in the following table and graphically illustrated in FIGS. 5 and 6.

| Curve No. | Stress relief | Cold expansion (prestrain) in.[1] | Cold expansion (prestrain) Percent | Proportional limit, p.s.i. | Yield strength, p.s.i. |
|---|---|---|---|---|---|
| A1 | None | None | None | 0 | 49,300 |
| A2 | 600° F | None | None | 47,100 | 57,600 |
| B1 | None | .03 | .188 | 32,700 | 54,000 |
| B2 | 600° F | .03 | .188 | 49,100 | 59,700 |
| C1 | None | .06 | .375 | 38,400 | 56,000 |
| C2 | 600° F | .06 | .375 | 52,900 | 61,600 |
| D1 | None | .08 | .500 | 42,300 | 58,200 |
| D2 | 600° F | .08 | .500 | 54,900 | 63,300 |
| E1 | None | .16 | 1.000 | 44,500 | 62,900 |
| E2 | 600° F | .16 | 1.000 | 60,800 | 69,100 |
| F1 | None | .26 | 1.625 | 46,400 | 66,300 |
| F2 | 600° F | .26 | 1.625 | 67,300 | 73,400 |
| G1 | None | .32 | 2.000 | 56,000 | 68,000 |
| G2 | 600° F | .32 | 2.000 | 69,300 | 74,900 |
| H1 | None | .48 | 3.000 | 62,500 | 74,100 |
| H2 | 600° F | .48 | 3.000 | 72,200 | 79,400 |
| I1 | None | .80 | 5.000 | 66,400 | 81,400 |
| I2 | 600° F | .80 | 5.000 | 84,100 | 88,000 |

[1] Indicates increase in diameter in inches due to cold expansion.

It will be evident from the above data that cold expansion followed by a high-speed, low-temperature stress relief operation produces a significant increase in yield strength and proportional limit at all degrees of cold expansion thus far investigated. While tests to date have not utilized more than a 5% cold expansion, it is believed that higher degrees of cold expansion would result in even greater increases in yield strength and proportional limit than those indicated in the foregoing table.

According to other tests which have been made on pipe processed in accordance with the present invention, it has been found that the ratio of yield strength to ultimate strength was in all cases less than the .85 maximum specified by API 5LX for cold expanded pipe, and that high-speed, low-temperature stress relief in combination with cold expansion had little effect on the longitudinal tensile, yield and elongation properties of the pipe, increased the hardness of the pipe metal, but did not adversely affect either the strength or soundness of the weld seam, or the microstructure of the metal at 1000 diameters magnification.

It has thus been established that the high-speed, low-temperature stress relief procedure of the present invention, when applied to an ERW steel pipe after cold sizing, can result in an improvement of the proportional limit and yield strength of the pipe equivalent to one API grade, and that the cumulative effect of cold expansion followed by stress relief can improve the pipe by at least two API grades. From a practical standpoint, these results are of substantial economic importance in that stress relieving, particularly when coupled with cold expansion, can reduce or eliminate scrap or rework caused by pipe expansion during hydrostatic testing, as when (a) the pipe is expanded beyond the maximum outside diameter tolerance, (b) the pipe is bent or bowed due to differential expansion and permanent set, and (c) the beveled ends of the pipe are "out of square" due to the differential permanent set.

Also, the higher the level of carbon, manganese or other alloys added for strength purposes, the higher will be the manufacturing losses, generally speaking. This is particularly true in the X56 and X60 grades of API pipe which require the addition of vanadium or columbium as an alloying agent to bring the yield strength up to the desired minimum value. The tests which have been made on pipe produced in accordance with this invention indicate that X60 pipe can be made from steel which normally would be used for X52 or X56 pipe, and thereby result in significant savings from the use of a lower cost steel and lower scrap, i.e., a higher yield of skelp into pipe.

Although two specific embodiments of the invention have been described and illustrated in the accompanying drawings, it will be obvious to those skilled in the art that various modifications may be made in the details of the procedure and in the apparatus used for carrying out the method. It is therefore intended by the appended claims to cover all such modifications which fall within the inventive concept.

We claim:

1. A method of improving the physical properties of electric resistance welded steel pipe which has been sized in a cold state and which has a wall thickness in the range from .188 inch to .500 inch when the outside diameter of the pipe ranges from 8⅝ inches to 20 inches comprising the steps of rapidly heating the sized pipe as a whole to a predetermined temperature below the transformation temperature of the steel from which the pipe is formed, in the range of from about 300° F. to about 1000° F., by exposure of the pipe to a source of heat for not more than about one minute irrespective of the wall thickness of the pipe, removing the pipe from exposure to the source of heat substantially as soon as the pipe has reached the predetermined temperature, and then cooling the pipe to ambient temperature.

2. The method as defined in claim 1 wherein the pipe is heated by moving it through a heating zone at a relatively high speed such that the temperature of the pipe is raised to the predetermined temperature in not more than about one minute after the pipe enters the heating zone.

3. The method as defined in claim 1 wherein the pipe is heated to a temperature in the range of from about 600° F. to about 900° F., and is air-cooled after removal from exposure to the source of heat.

4. The method as defined in claim 1 wherein the pipe is heated to a temperature of approximately 600° F. by exposure to the source of heat for not more than about 30 seconds.

5. A method of manufacturing electric resistance welded steel pipe of improved physical properties having a wall thickness in the range from .188 inch to .500 inch when the outside diameter of the pipe ranges from 8⅝ inches to 20 inches comprising the steps of forming a welded steel pipe, sizing the pipe while in a cold state so as to produce up to about a 5% change in the outside diameter thereof, rapidly heating the sized pipe as a whole to a predetermined temperature in the range of from about 300° F. to about 1000° F. by exposure of the pipe to a source of heat for not more than about one minute irrespective of the wall thickness of the pipe, removing the pipe from exposure to the source of heat as soon as the pipe has reached the predetermined temperature, and then cooling the pipe to ambient temperature.

6. The method as defined in claim 5 wherein the pipe is sized by expanding the pipe by the application of internal pressure until the outside diameter thereof is increased by an amount up to approximately 5.0% of its original size.

7. The method as defined in claim 5 wherein the pipe is sized while in a cold state by first externally compressing the pipe so that the outside diameter thereof is in the range of from about 95.00% to about 99.95% of the desired finished diameter, and then expanding the pipe by the application of internal pressure until the outside diameter thereof is increased to the desired finished diameter.

8. The method as defined in claim 5 wherein the sized pipe is heated to a temperature of approximately 600° F. by exposure to a source of heat for not more than about 30 seconds.

9. A method of manufacturing electric resistance welded steel pipe of improved physical properties having a wall thickness in the range from .188 inch to .500 inch when the outside diameter of the pipe ranges from 8⅝ inches to 20 inches comprising the steps of forming a welded steel pipe having an outside diameter which is less than the desired finished diameter, expanding the pipe in a cold state by the application of internal pressure until the outside diameter thereof is increased to the desired finished diameter, rapidly heating the cold expanded pipe as a whole to a temperature in the range of from about 600° F. to about 900° F. by exposure of the pipe to a source of heat for not more than about one minute irrespective of the wall thickness of the pipe, removing the pipe from exposure to the source of heat as soon as the pipe has reached the predetermined temperature, and then air-cooling the pipe to ambient temperature.

10. The method as defined in claim 9 wherein the cold expanded pipe is heated by moving it through a heating zone at a relatively high speed such that the temperature of the pipe is raised to approximately 600° F. in not more than about 30 seconds after the pipe enters the heating zone.

References Cited

UNITED STATES PATENTS

| | | | |
|---|---|---|---|
| 2,047,254 | 7/1936 | Burnish | 219—67 X |
| 2,078,356 | 4/1937 | Wilson | 219—50 X |
| 2,235,243 | 3/1941 | Adelson | 72—364 X |
| 3,015,018 | 12/1961 | Rudd | 219—67 |
| 3,192,080 | 6/1965 | Cooper | 148—127 |
| 2,262,705 | 11/1941 | Tuttle | 219—91 |
| 3,317,703 | 5/1967 | Gilbert | 219—110 |

JOSEPH V. TRUHE, Primary Examiner

L. A. SCHUTZMAN, Assistant Examiner

U.S. Cl. X.R.

29—497; 148—127; 219—55

PO-1050
(5/69)

UNITED STATES PATENT OFFICE
CERTIFICATE OF CORRECTION

Patent No. 3,535,484        Dated October 20, 1970

Inventor(s) William E. Snow et al.

It is certified that error appears in the above-identified patent and that said Letters Patent are hereby corrected as shown below:

Column 3, line 34, "consequently" should read --consequent--. Column 5, line 33, "(p.s.i.)" should appear beneath "Yield strength"; between lines 43 and 44, the words --variation in the stress relieving temperature on the-- should appear. Column 6, line 33, "preferably" should read --preferable--. Column 7, in the table, in the column headed "Proportional limit, p.s.i.", "32.700" should read --32,700--.

SIGNED AND
SEALED
DEC 20 1970

(SEAL)
Attest:

Edward M. Fletcher, Jr.
Attesting Officer

WILLIAM E. SCHUYLER, JR.
Commissioner of Patents